United States Patent [19]

Orimoto et al.

[11] Patent Number: 5,146,069
[45] Date of Patent: Sep. 8, 1992

[54] DEVICE FOR LOADING AND UNLOADING A MEMORY CARTRIDGE USING A SLIDING MEMBER

[75] Inventors: Masaaki Orimoto; Toshikatsu Harase, both of Tokyo, Japan

[73] Assignee: Fuji Photo Film Co., Ltd., Kanagawa, Japan

[21] Appl. No.: 401,606

[22] Filed: Aug. 31, 1989

[30] Foreign Application Priority Data

Sep. 19, 1988 [JP]  Japan .................. 63-232673
Sep. 19, 1988 [JP]  Japan .................. 63-232674
Sep. 19, 1988 [JP]  Japan .................. 63-232675
Sep. 19, 1988 [JP]  Japan .................. 63-232676

[51] Int. Cl.$^5$ ............... G06K 13/00; G06K 13/04; G06K 13/063; G06K 13/067
[52] U.S. Cl. ................... 235/475; 235/479; 235/485
[58] Field of Search ........ 235/441, 492, 486, 479, 235/475, 476, 480, 483, 477, 481, 485

[56] References Cited

U.S. PATENT DOCUMENTS

| 3,850,426 | 11/1974 | Blair ................. 235/485 |
| 4,404,464 | 9/1983 | Moreno ............... 235/441 |
| 4,527,052 | 7/1984 | Kilborn .............. 235/485 |
| 4,724,310 | 2/1988 | Shimamura et al. .... 235/483 |
| 4,914,279 | 4/1990 | Massey ............... 235/475 |
| 4,994,658 | 2/1991 | Takahashi et al. .... 235/485 |

FOREIGN PATENT DOCUMENTS

| 58-175079 | 10/1983 | Japan ................ 235/441 |
| 1-057389 | 3/1989 | Japan ................ 235/475 |

Primary Examiner—John W. Shepperd
Assistant Examiner—Christopher R. Glembocki
Attorney, Agent, or Firm—Sughrue, Mion, Zinn Macpeak & Seas

[57] ABSTRACT

A memory cartridge loading/unloading device is disclosed which loads and unloads a memory cartridge from an apparatus for using the memory cartridge by means of motor driving. In the loading/unloading device, until the memory cartridge reaches a given position within a main body of the apparatus, the memory cartridge is pulled in by rotating a roller which presses against the memory cartridge such that there can be produced a given friction force with respect to the memory cartridge. When the memory cartridge reaches the given position, then an engagement member is brought into engagement with the memory cartridge and then the engagement member is moved in a cartridge insertion direction by means of motor driving, so that the memory cartridge can be pushed into a connector disposed within the apparatus main body.

6 Claims, 6 Drawing Sheets

DEVICE FOR LOADING AND UNLOADING A MEMORY CARTRIDGE USING A SLIDING MEMBER

BACKGROUND OF THE INVENTION

1. Field of the Invention

The present invention relates to a device which can be driven by a motor to load a memory cartridge into a main body of an apparatus for using the memory cartridge and unload the memory cartridge from the main body of the apparatus.

2. Description of the Related Art

Recently, attention has been given to a memory cartridge as an external memory means for use in electronic equipment. As the memory cartridge of this type, there is available an IC card or a memory card, for example. Such memory cartridge comprises a card-like box and a semiconductor memory (EPROM, SRAM or the like), a microcomputer, a back-up battery and the like, all of which are stored in the card-like box. Also, for access to the semiconductor memory and the like, there are arranged a large number of terminals which can be connected to connectors disposed in the electronic equipment. The box is, in general, several mm in thickness but it may have a greater thickness according to cases.

The above-mentioned type of memory cartridge is manually inserted into or removed from the connectors on the side of the electronic equipment. However, in such insertion or removal of the memory cartridge, a large resistance is produced due to the fact that the number of the terminals is large and, therefore, a great force is necessary to insert or remove such memory cartridge.

To cope with this, according to the prior art, the memory cartridge must be projected out from the apparatus main body and there must be secured a finger hold in order to take the memory cartridge out of the apparatus main body. For this reason, the memory cartridge is easily touchable and there is the possibility of the memory cartridge being damaged.

Also, there has been conventionally known a memory cartridge unloading mechanism in which the entire memory cartridge is accommodated in the apparatus main body and leverage is used to remove the memory cartridge with ease.

Further, conventionally, as a device which is driven by a motor to carry a card-like member such as a cash card or the like, there is known a loading/unloading device which loads or unloads the card-like member by use of a friction force applied through a rotating rubber roller.

However, in the conventional, manually-operated memory cartridge unloading mechanism using leverage, there is a limit in reducing the operation loads thereof and, especially when such memory cartridge unloading mechanism is applied to a small-size, installation-type equipment, there is present a problem that the entire apparatus may be moved by an operational force necessary for loading/unloading of the memory cartridge.

Also, due to the fact that large loads are necessary when the memory cartridge is inserted into or removed from the connectors in the loading/unloading device using the friction force by the rubber roller or the like, it is very difficult to insert or remove the memory cartridge in a stable manner.

Further, there is possible a method in which by driving a motor a memory cartridge engagement member is moved to thereby mount a memory cartridge to a connector. However, in this method, it is necessary to guarantee that the memory cartridge can be mounted with accuracy.

SUMMARY OF THE INVENTION

The present invention aims at eliminating the drawbacks found in the above-mentioned conventional devices.

Accordingly, it is an object of the invention to provide a memory cartridge loading/unloading device which has excellent operability and is capable of accurately inserting and removing a memory cartridge by jointly using two drive means to be driven by a motor.

It is another object of the invention to provide a memory cartridge loading/unloading device which is capable of accurately mounting a memory cartridge to a connector by use of driving of a motor and of eliminating the possibility that an unreasonable force may be applied between the memory cartridge and connector.

In order to achieve the above objects, according to one aspect of the invention, there is provided a memory cartridge loading/unloading device which comprises: friction feed means which has a roller adapted to press against a memory cartridge, which has been inserted into a given position within a main body of an apparatus for using the memory cartridge, so as to produce a given friction force, and which pulls in the memory cartridge by the above-mentioned friction force by driving the roller in a cartridge insertion direction by a motor; and engagement feed means which has a slide member freely movable in a cartridge insertion/discharge direction and including an engagement member retreatable apart from the memory cartridge while the memory cartridge is being pulled in by the friction feed means and engageable with the memory cartridge when the memory cartridge is pulled in by a given amount.

According to the invention, the friction feed means to be driven by a motor is combined with the engagement feed means to be driven by a motor so as to mount the memory cartridge. That is, at first, the memory cartridge is pulled in to a position adjacent to the connector by the friction feed means and then the memory cartridge is pushed into the connector by the engagement feed means. Here, according to the friction feed means, the roller, which presses against the memory cartridge so as to produce a given friction force with respect to the memory cartridge, is driven by a motor in the cartridge insertion direction to thereby pull in the memory cartridge by means of the above-mentioned friction force. Due to this, although the pulling force of the friction feed means is weak, for example, if the memory cartridge is inserted reversedly, then the loads of the memory cartridge are greater than the above-mentioned friction force to cause the memory cartridge to slide idly, with the result that the memory cartridge cannot be drawn in further than necessary. On the other hand, the engagement feed means is able to perform a sufficient force to push the memory cartridge into the connector, because it brings its engagement member into engagement with the memory cartridge. Here, it should be noted that the engagement member is adapted to retreat away from the memory cartridge during the pulling operation by the friction feed means so as not to prevent the pulling-in of the memory cartridge.

According to another aspect of the invention, there is provided a memory cartridge loading/unloading device comprising: first and second slide members movable freely in a cartridge insertion direction and interconnected with each other through a spring; an engagement member disposed in the first slide member and engageable with the memory cartridge when the memory cartridge is inserted into a given position within a main body of an apparatus for using the memory cartridge; and slide member drive means for moving the second slide member in the cartridge insertion direction by means of motor driving, said slide member drive means moving the second slide member to a position in which the memory cartridge can be mounted to a connector disposed within the apparatus main body and a given energizing force can be given through the above-mentioned spring to the memory cartridge mounted to the connector.

According to the invention, if the memory cartridge is inserted into a given position within the apparatus main body, then the engagement member disposed in the first slide member is brought into engagement with the memory cartridge. Then, if the second slide member is moved in the cartridge insertion direction by means of motor driving, then the memory cartridge is given a pulling force from the second slide member through the spring, the first slide member and the engagement member, so that the memory cartridge is moved in the cartridge insertion direction. When the second slide member is moved to a given position, then the memory cartridge is mounted to the connector and a given energizing force is temporarily given to the memory cartridge through the above-mentioned spring. Due to this, the memory cartridge can be mounted to the connector accurately and there is eliminated the possibility that an unreasonable force may be applied between the memory cartridge and connector.

BRIEF DESCRIPTION OF THE DRAWINGS

The exact nature of this invention, as well as other objects and advantages thereof, will be readily apparent from consideration of the following specification relating to the accompanying drawings in which like reference characters designate the same or similar parts throughout the figures thereof and wherein:

FIGS. 7 (A) to (E) are respectively side elevation views of main portions of a memory cartridge loading-/unloading device according to the invention, illustrating the respective loading and unloading operation states of a memory cartridge; and, FIGS. 8 (A) to (E) are respectively timing charts to show the relationship between the outputs of sensors and the loading and unloading operations by the device.

DETAILED DESCRIPTION OF THE INVENTION

Detailed description will hereunder be given of the preferred embodiment of a device for loading and unloading a memory cartridge according to the present invention with reference to the accompanying drawings.

Figure 1:
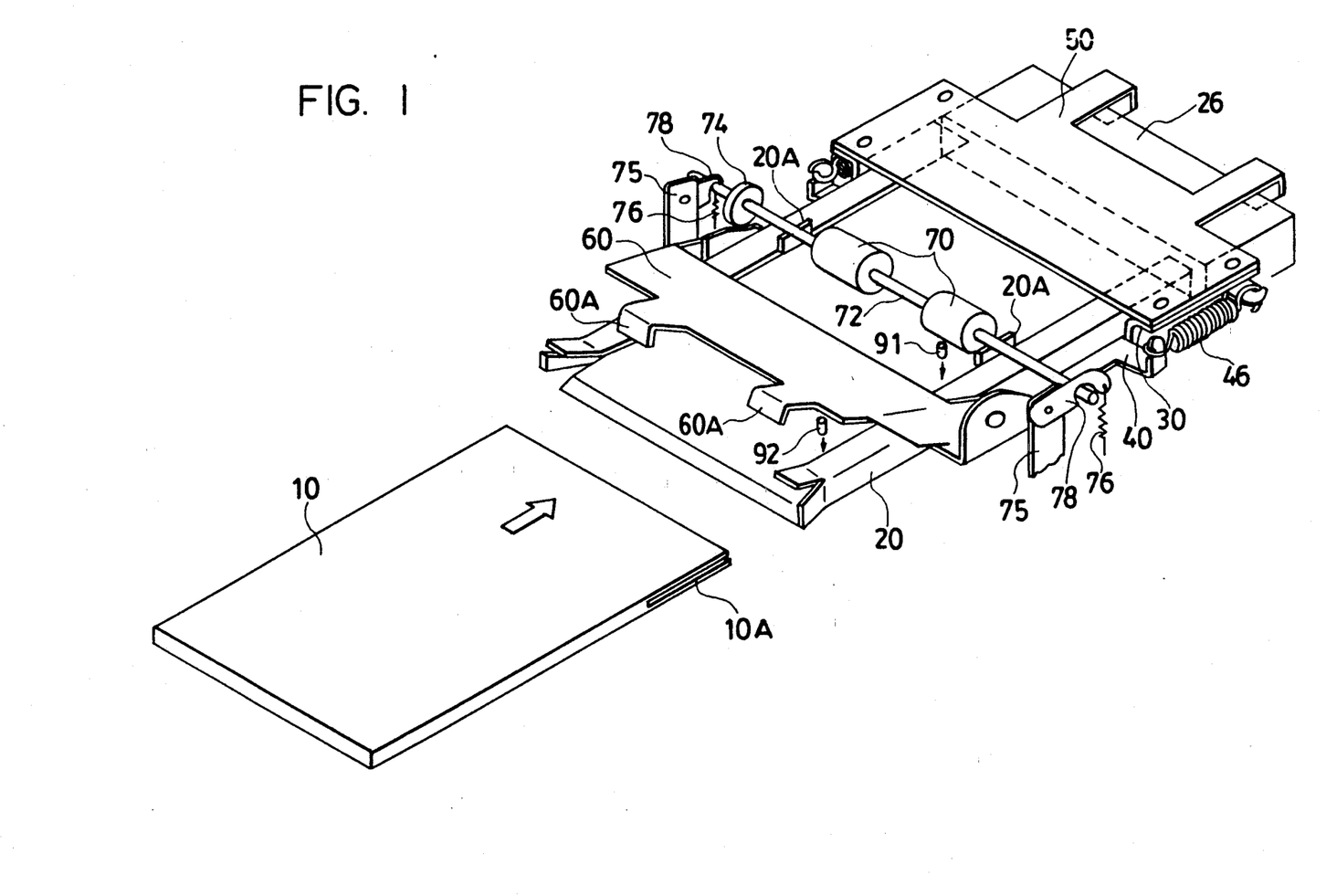
FIG. 1 is a perspective view of an embodiment of a memory cartridge loading unloading device according to the invention.
Figure 2:
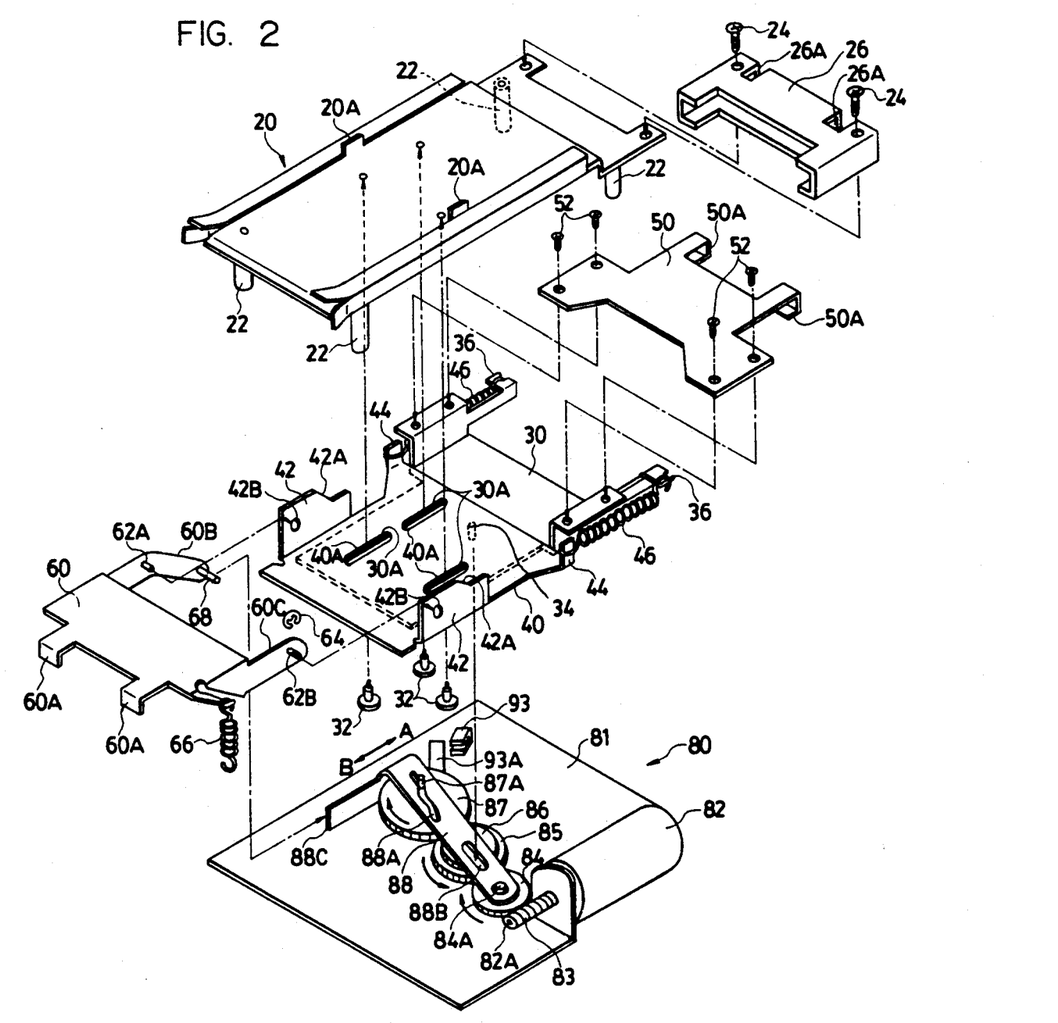
FIG. 2 is an exploded, perspective view of main portions of the embodiment shown in FIG. 1.

As shown in FIGS. 1 and 2, a memory cartridge loading/unloading device consists mainly of a guide member 20 for guiding a memory cartridge 10, slide plates 30 and 40, a discharge claw 50, a pull-in claw 60, a roller 70 (FIG. 1), and a slide plate drive part 80 (FIG. 2).

The guide member 20 is used to guide the memory cartridge 10 in a direction in which the memory cartridge 10 is inserted and discharged, and the guide member 20 is arranged and fixed onto a chassis 81 by four mounting legs 22. Also, a connector 26 is secured to the deep end of the guide member 20 by screws 24, 24. Further, substantially in the central portion of the guide member 20, there are provided projectingly bearing pieces 20A, 20A which are used to support or journal a shaft of rotation 72 of the roller 70.

The slide plates 30 and 40 are used to move the discharge claw 50 and pull-in claw 60 in the cartridge insertion and discharge direction, respectively, and the slide plates 30 and 40 are respectively formed with three elongated holes 30A and three elongated holes 40A. These elongated holes 30A and 40A, as shown in FIG. 2, can be made to substantially coincide with one another by superposing the slide plate 40 on the slide plate 30. And, the slide plates 30 and 40 are mounted to the guide member 20 by three guide pins 32 to be fixed to the guide member 20 through the above-mentioned elongated holes 30A, 40A in such a manner that they are free to move in the cartridge insertion and discharge direction.

Also, on the lower surface of the slide plate 30, there is planted a piston 34 to which a driving force is transmitted from the slide plate drive member 80 to be described later. On the other hand, in the slide plate 40, there are provided bearing piece members 42, 42 which journals the pull-in claw 60 such that the claw 60 can be rotated freely, and, in the bearing piece members 42, 42, there are formed tapered cam portions 42A, 42A which are used to push up the rotation shaft 72 of the roller 70 when the slide plate 40 is moved.

Further, in the slide plates 30 and 40, there are provided hook members 36, 36 and 44, 44, respectively, and, between the hook members 36, 36 and 44, 44, there are provided coil springs 46 and 46, respectively. Here, the slide plates 30 and 40 are interconnected to each other by these coil springs 46, 46 with a force of the order of 3~4 kg.

The discharge claw 50 is screwed to the slide plate 30 by means of four screws 52 and includes claw portions 50A and 50A which can be moved into the connector 26 through cut-out portions or notch portions 26A and 26A respectively formed in the connector 26 and can then be brought into contact and engagement with the front surface of the memory cartridge 10. Further, the discharge claw 50 is moved with the movement of the slide plate 30 to discharge the memory cartridge 10 mounted to the connector 26 at least until the memory cartridge 10 slips out of the connector 26.

On the other hand, the pull-in claw 60 includes arm portions 60B and 60C in which there are provided shafts 62A and 62B, respectively. Thus, the shafts 62A and 62B are inserted into holes 42B and 42B formed in the bearing piece members 42 and 42 in the slide plate 40, respectively, and after then an E ring is fitted over the shaft 62B, so that the pull-in claw 60 can be rotatably mounted to the slide plate 40. Also, in the pull-in claw 60, there is provided a coil spring 66 which energizes the pull-in claw 60 in a direction to close the pull-in claw 60 and, in the arm portion 60B, there is erected a pin 68 to which is transmitted a driving force that opens the pull-in claw 60 against the energizing force of a coil spring 66.

As, the slide plate 40 is moved in the cartridge insertion direction, the pull-in claw 60 is closed and moved to bring its claw portions 60A and 60A into contact and engagement with the rear surface of the memory cartridge 10 so as to push the memory cartridge 10 into the connector 26.

The roller 70 (FIG. 1) is formed of a material (for example, rubber) having a large coefficient of friction and is fixed onto the rotation shaft 72. A gear 74 is fixed to the rotation shaft 72 such that a rotational driving force can be transmitted to the gear 74 from a reversible motor (not shown). Due to this, the roller 70 can be driven such that it is rotated forwardly in the cartridge insertion direction or reversedly in the cartridge discharge direction.

Further, the two ends of the rotation shaft 72 are disposed freely rotatably on support members 75 and 75, respectively, and at the same time they are always energized rotatably by levers 78 and 78 energized by springs 76 and 76, respectively. In other words, as shown in FIG. 1, before the memory cartridge 10 is inserted, the rotation shaft 72 is supported by the bearing pieces 20A and 20A and, when the memory cartridge 10 is inserted into a given position, then the roller 70 is pushed upward by the memory cartridge 10 against the energizing forces of the springs 76 and 76 and is then brought into contact with the memory cartridge 10 with a given pressing force.

In this state, if the roller 70 is rotated forwardly or reversedly, then the roller 70 applies onto the memory cartridge 10 a friction force in the cartridge insertion or discharge direction, that is, the memory cartridge 10 is pulled in or drawn out by the friction force.

The slide plate drive part 80 (FIG. 2) comprises a motor 82, a worm 83, gears 84, 85, 86, 87, and a drive lever 88. The motor 82 is fixedly secured to a chassis 81 and the worm 83 is disposed on a shaft 82A of the motor 82. Also, the gears 84, 85, 86 and 87 are respectively disposed on the chassis 81 such that they are free to rotate and the rotational driving force of the motor 82 is transmitted through the worm 83, gears 84, 85 and 86 to the gear 87.

On the other hand, the drive lever 88 shares a shaft 84A of the gear 84 in common with the gear 84 and is free to rotate about the shaft 84A. The drive lever 88 is formed with a cam groove 88A and an elongated hole 88B and is also formed with a pressure piece 88C which is turned down from the drive lever 88. A pin 87A on the gear 87 is in engagement with the cam groove 88A and the pin 34 on the slide plate 30 is in engagement with the elongated hole 88B. Also, the pressure piece 88C is adapted such that it can press against the pin 68 of the pull-in claw 60 according to the rotational positions of the drive lever 88.

In other words, the drive lever 88 can be rotated about the shaft 84A in the direction of arrows A and B by means of the rotational movements of the gear 87. When rotating in the direction of the arrow A, the drive lever 88 transmits the driving force through the elongated hole 88B and pin 34 to the slide plate 30 to thereby move the slide plate 30 in the cartridge insertion direction as well as to remove the pressure of the pin 68 by means of the pressure piece 88C to thereby close the pull-in claw 60. Also, when rotating in the direction of the arrow B, the drive lever 88 transmits the driving force through the elongated hole 88B and pin 34 to the slide plate 30 thereby move the slide plate 30 in the cartridge discharge direction as well as to press the pin 68 by means of the pressure piece 88C to thereby open the pull-in claw 60.

Further, in the memory cartridge loading/unloading device, there are disposed three photo sensors, that is, photo sensors 91, 92 (FIG. 1) and a photo sensor 93 (FIG. 2). The photo sensor 91 is a device which detects the pull-in start position of the memory cartridge 10, that is, it detects the leading end of the memory cartridge 10 optically when the leading end of the memory cartridge 10 comes into contact with the roller 70 or enters slightly under the roller 70. The photo sensor 92 is used to detect the fact that the memory cartridge 10 approaches the contact of the connector 26, that is, it detects optically the following end of the memory cartridge 10 when the memory cartridge 10 approaches the contact of the connector 26. Alternatively, the photo sensor 92 may be disposed in the neighborhood of the connector 26 so that the leading end of the memory cartridge 10 when the memory cartridge 10 approached the contact of the connector 26 can be detected optically by photo sensor 92.

On the other hand, the photo sensor 93, as shown in FIG. 2, is disposed in the chassis 81 to detect that the memory cartridge 10 has been mounted to the connector 26 and that the memory cartridge 10 has been removed from the connector 26 in accordance with the positions of a lever 93A which can be oscillated with the rotation of the gear 87.

The reversible motor used to rotate the roller 70 and the motor 82 to move the slide plates 30, 40 are controlled in accordance with the detected outputs of the above-mentioned photo sensors 91, 92 and 93.

Next, description will be given below of the operation of the memory cartridge loading/unloading device constructed in the above-mentioned manner.

At first, the opening and closing operation of the pull-in claw 60 as well as the operation of the slide plate 30 will be explained with reference to FIGS. 3 to 6.

Figures 3A, 3B:
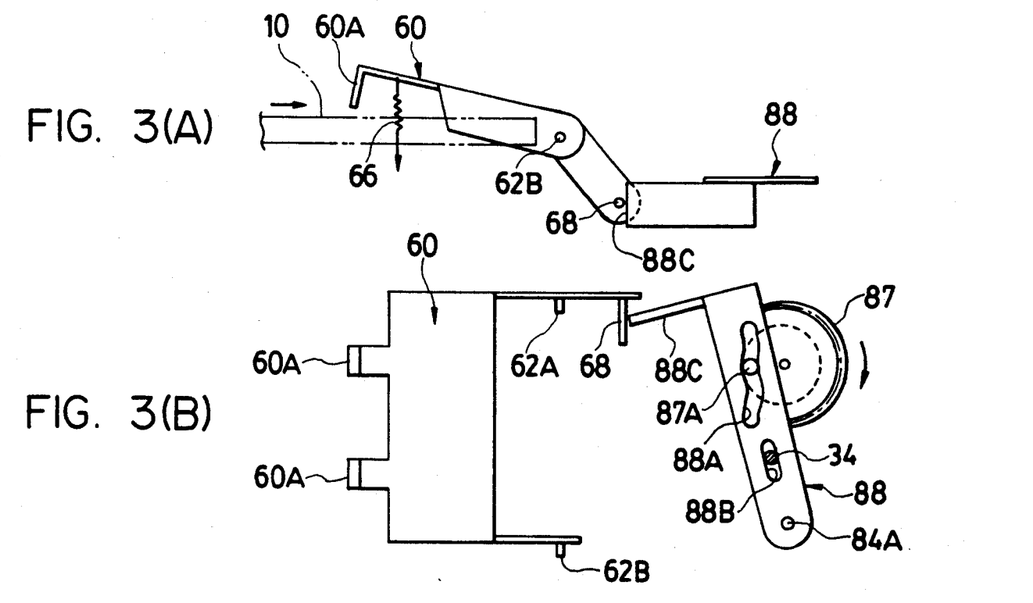
FIGS. 3 to 6 are explanatory views used to explain the opening and closing operation of a pull-in claw and the operation of a slide plate employed in the invention, respectively.

FIGS. 3(A) and (B) are respectively side and plan views of main portions of the pull-in claw and slide plate drive part, illustrating a state in which the pull-in claw 60 is open.

As shown in these figures, the drive lever 88 of the slide plate drive part 80 is located in such a position that the pressure piece 88C thereof presses against the pin 68 of the pull-in claw 60 against the energizing force of the spring 66 to thereby open the pull-in claw 60. Due to this, the claw portion 60A of the pull-in claw 60 is situated in such a position that it does not provide any obstacle to the movement of the memory cartridge 10 in the cartridge insertion direction.

Also, the position of the drive lever 88 at this time, that is, the position of the pin 87A on the gear 87 is detected by the photo sensor 93 (FIG. 2), which detects the position of the lever 93A oscillatable by the rotation of the gear 87, as a state in which the memory cartridge 10 has been removed from the connector 26. Here, the pin 87A on the gear 87 is situated in such a portion of the cam groove 88A in the drive lever 88 as having the same curvature with the pin 87A along which the pin 87A moves. For this reason, even if the gear 87 is rotated by a given amount, the drive lever 88 is prevented against and, as a result of this, the position of the drive lever 88 can be detected with accuracy even if the photo sensor 93 provides a low position detection accuracy.

Figures 4A, 4B:
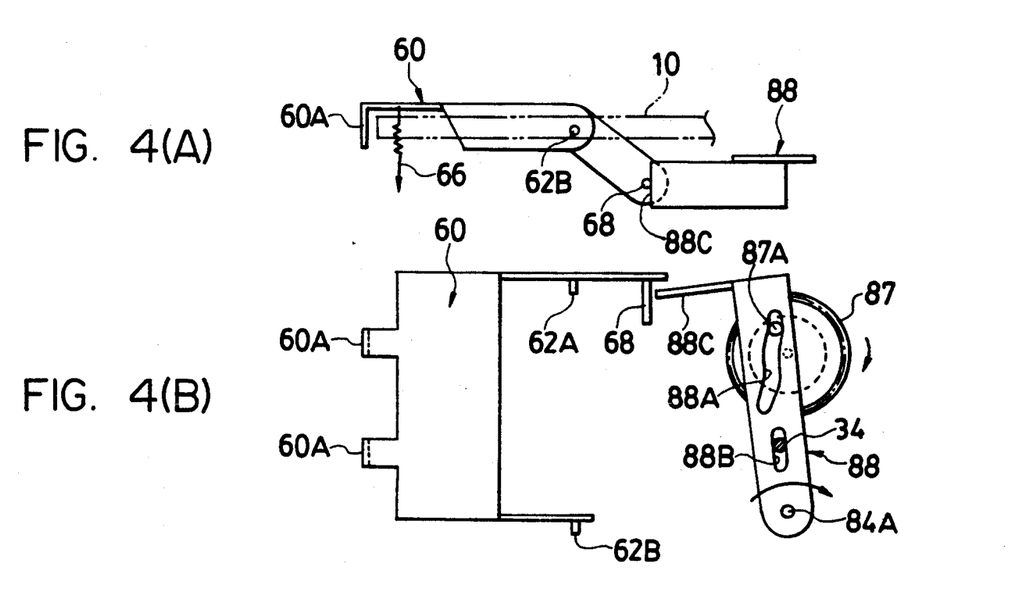

Here, if the gear 87 is rotated in a clockwise direction from a position shown in FIG. 3 to a position shown in FIG. 4, then the drive lever 88 is rotated clockwise about the shaft 84A to thereby remove the pressure of the pin 68 by the pressure piece 88C. As a result of this, the pull-in claw 60 is closed by the energizing force of the spring 60 so that the claw portion 60A thereof becomes engageable with the rear end face of the memory cartridge 10.

Also, by means of the rotational movement of the above-mentioned drive lever 88, the slide plate 30 with the pin 34 thereof in engagement with the elongated hole 88B in the drive lever 88 is moved in the cartridge insertion direction and, with the movement of the slide plate 30, the pull-in claw 60 is also moved in the same direction.

Figure 5A:
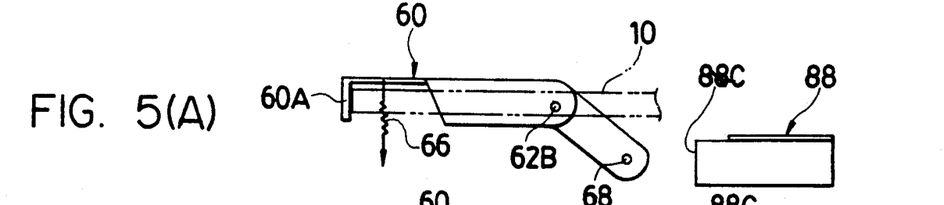
Figure 5B:
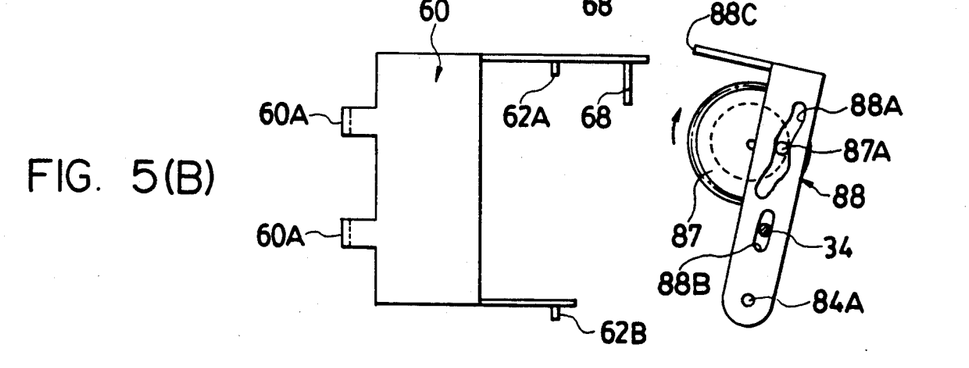

Then, if the gear 87 is further rotated clockwise from a position shown in FIG. 4 to a position shown in FIG. 5, then the drive lever 88 is further rotated clockwise about the shaft 84A and, in conjunction with the movement of the pin 34 in engagement with the elongated hole 88B in the drive lever 88, the pull-in claw 60 is moved in the cartridge insertion direction. As a result of this, the claw portion 60A of the pull-in claw 60 is brought into engagement with the rear end of the memory cartridge 10 and thus the pull-in claw 60 pushes the memory cartridge 10 into the connector 26. Also, the pressure piece 88C of the drive lever 88 is caused to part away from the pin 68. Here, in FIG. 5, there is shown a state in which the drive lever 88 is rotated furthest in the cartridge insertion direction.

Figures 6A, 6B:
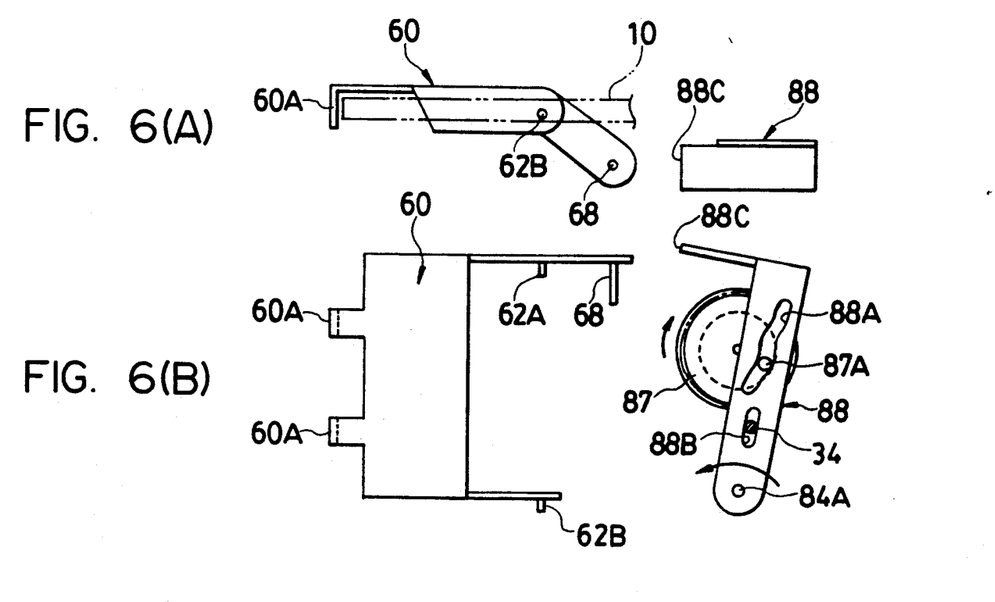

Next, if the gear 87 is rotated clockwise from a position shown in FIG. 5 to a position shown in FIG. 6, then the drive lever 88 is slightly rotated counter-clockwise about the shaft 84A. This causes the slide plate 30 to go back to a slight degree in the cartridge discharge direction. It should be noted here that this position is detected as such a position as the memory cartridge 10 is mounted to the connector 26. Also, at that time, the pin 87A on the gear 87, as has been explained in connected with FIG. 3, is situated at the other portion of the cam groove 88A in the drive lever 88 which has the same curvature with that of the pin 87A along which the pin 87A moves.

If the gear 87 is rotated again in the clockwise direction from the position shown in FIG. 6 to the position shown in FIG. 3, then the drive lever 88 is rotated counter-clockwise about the shaft 84A. Consequently, as will be discussed later, the slide plate 30 is moved in the cartridge discharge direction and, with this movement of the slide plate 30, the discharge claw 50 is also moved in the same direction to thereby discharge the memory cartridge 10 out of the connector 26. Also, since the pin 68 is pressed by the pressure piece 88C of the drive lever 88, the pull-in claw 60 is opened again, allowing the memory cartridge to be taken out.

It should be noted here that, when driving the slide plate 30, the above-mentioned drive lever 88 serves as a lever to thereby be able to apply a greater force (about twice) through the pin 34 to the slide plate 30 than the force applied by the pin 87A on the gear 87.

Next, description will be given below of the mounting and unloading operations of the memory cartridge with reference to FIGS. 7 and 8.

Figure 7A:
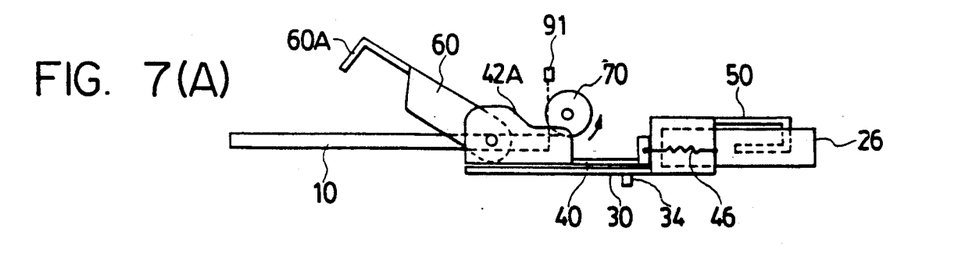
Figures 8A, 8B, 8C:
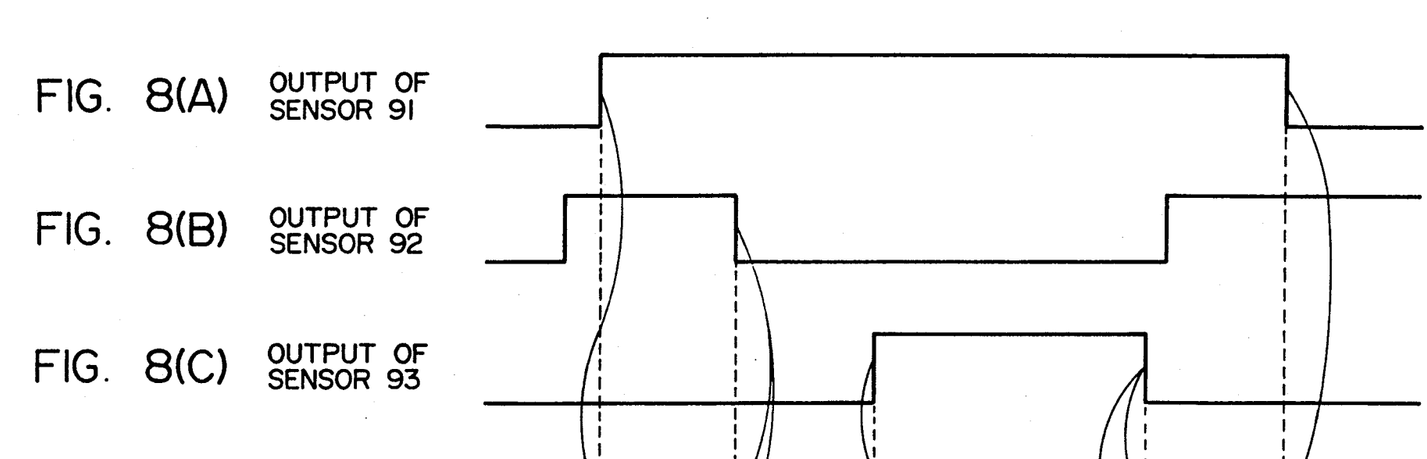

At first, when the memory cartridge 10 is inserted into a position shown in FIG. 7(A), then the photo sensor 91 detects the leading end of the memory cartridge 10 and provides an output signal which rises to an H level (FIG. 8(A)). At the time when the output signal of the photo sensor 91 rises, the reversible motor for driving the roller 70 is driven to rotate forwardly and thus the roller 70, which comes in contact with the memory cartridge 10 with a constant pressure, is rotated in the cartridge insertion direction so that the memory cartridge 10 can be pulled in by means of the friction force of the roller 70 (FIG. 8(D)).

Figure 7B:
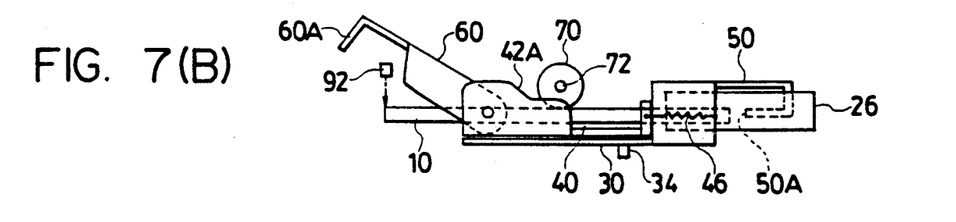

When the memory cartridge 10 is pulled into a position shown in FIG. 7(B) by the roller 70, then the following end of the memory cartridge 10 passes through the detection position of the photo sensor 92, which causes the output signal of the photo sensor 92 to fall down to an L level (FIG. 8(B)). At the time when the output signal of the photo sensor 92 falls down, the pull-in operation of the roller 70 is stopped and also the motor 82 of the slide plate drive part 80 is driven, so that the movement of the slide plate 30 in the cartridge insertion direction is started (FIGS. 8(D), (E)). At that time, the leading end of the memory cartridge 10 is situated just before the contact of the connector 26.

Figure 7C:
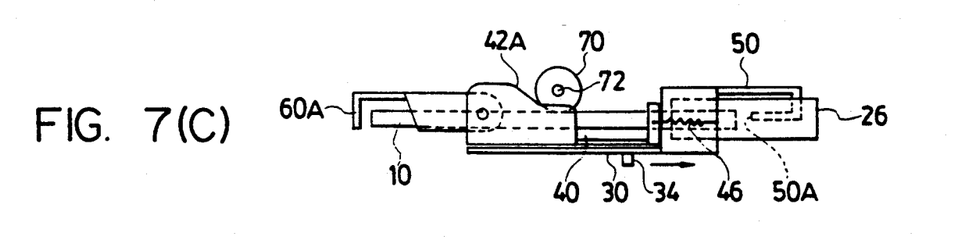

When the movement of the slide plate 30 in the cartridge insertion direction is started, then, as discussed before, the pull-in claw 60 is closed, which makes it possible for the pull-in claw 60 to push in the memory cartridge 10 (FIG. 7(C)).

Figure 7D:
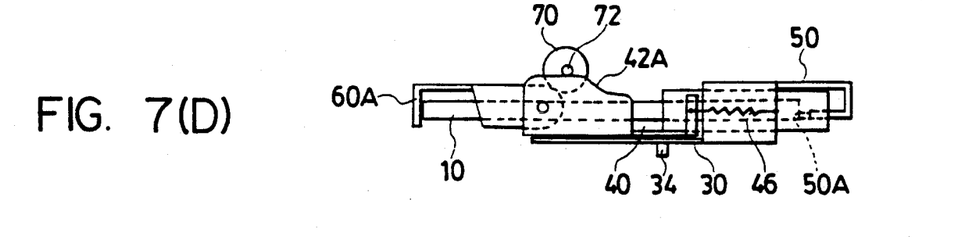
Figure 7E:
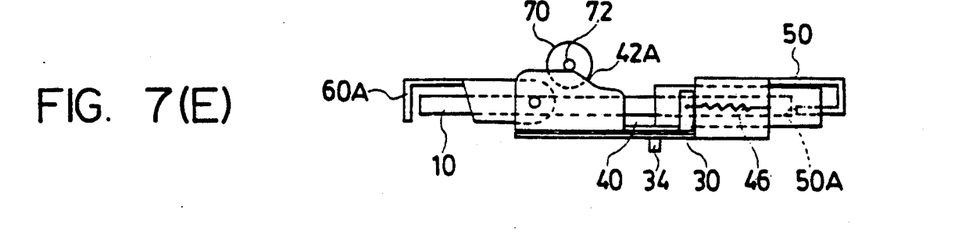

Further, if the slide plate 30 is moved to a position shown in FIG. 7(E) by way of a position shown in FIG. 7(D) which is situated right-hand-most end in FIG. 7, then the output signal of the photo sensor 93 rises to the H level (FIG. 8(C)). At the rising time of the output signal of the photo sensor 93, then motor 92 is stopped to complete the loading operation of the memory cartridge 10 to the connector 26 by means of the movement of the slide plate 30, that is, the movement of the pull-in claw 60(FIG. 8(E)).

It should be noted here that a force toward the cartridge insertion direction can be given by the slide plate 30 to the pull-in claw 60 through the coil spring 46 and slide plate 40 and also that, as shown in FIG. 7(D), the slide plate 30 can be over stroked in the cartridge insertion direction further than the position in which the memory cartridge 10 is mounted to the connector 26. Therefore, a load (for example, 3 kgf) corresponding to the extension of the coil spring 46 due to the over stroke is applied temporarily between the memory cartridge 10 and connector 26, thereby ensuring the mounting of the memory cartridge.

Also, the tapered cam portion 42A provided in the bearing piece 42 of the slide plate 40 comes into engagement with the rotation shaft 72 of the roller 70 with movement of the slide plate 40 in the cartridge insertion direction and pushes up the roller 70 to thereby prevent the roller 70 from contacting with the memory cartridge 10 when the mounting of the memory cartridge 10 is completed, as shown in FIG. 7(D). Due to this, even if the memory cartridge 10 mounted to the connector 26 is left as it is, since the roller 70 is not in contact with the memory cartridge 10, the deformation of the roller 70 can be prevented and, since unnecessary external forces due to the pressure by the roller 70 are not applied to the memory cartridge 10, there is eliminated the possibility that the internal parts of the memory cartridge may be damaged or destroyed.

On the other hand, to take out the memory cartridge 10, an eject button or the like is turned on to drive the motor 82 of the slide plate drive part 80 again to thereby move the slide plate 30 in the cartridge discharge direction. As a result of this, the claw portion of the discharge claw 50 is moved into the connector 26 and is then brought into contact with the front surface of the memory cartridge 10, so that the memory cartridge 10 is pushed out from the connector 26.

Figures 8D, 8E:
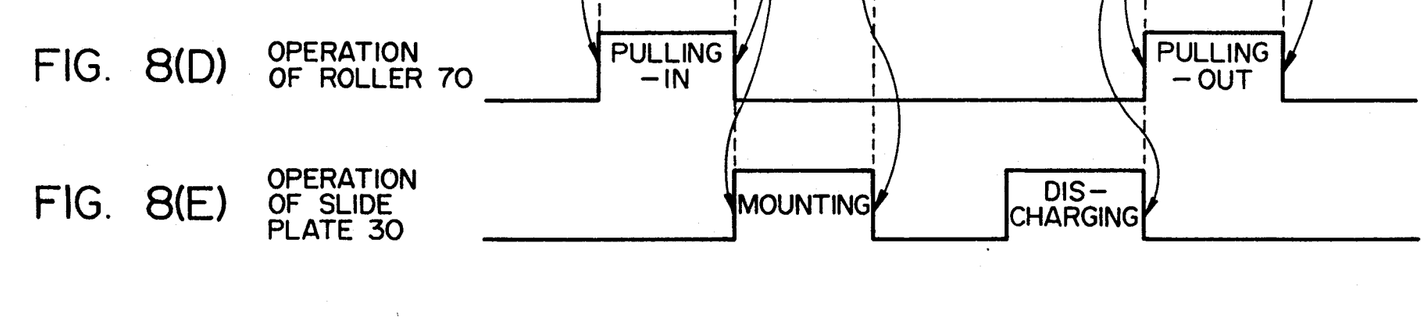

When the memory cartridge 10 is discharged out from the connector 26 in the above-mentioned manner, then the output signal of the photo sensor 93 falls down to the L level (FIG. 8(C)). At the falling time of the output signal of the photo sensor 93, the motor 82 is stopped to complete the discharge operation of the memory cartridge 10 from the connector 26 by means of the movement of the slide plate 30, that is, the movement of the discharge claw 50, and at the same time an operation to take out the memory cartridge by the roller 70 is started (FIGS. 8(D), (E)). In other words, the reversible motor for driving the roller 70 is driven to rotate in a reversed direction and, as a result of this, the roller 70 in contact with the memory cartridge 10 with a constant pressure is rotated in the cartridge discharge direction to take out the memory cartridge 10 by means of the friction force thereof.

Further, if the memory cartridge 10 is drawn out to a position in which the pulling-out of the memory cartridge 10 is completed, then the output signal of the photo sensor 91 falls down to the L level (FIG. 8(A)). At the falling time of the output signal of the photo sensor 91, the driving of the reversible motor is stopped to thereby complete the pulling-out operation of the roller 70 (FIG. 8(D)).

By means of the above-mentioned pulling-out operation of the memory cartridge 10, the memory cartridge 10 is projected out of the apparatus main body using the memory cartridge 10 by a sufficient amount for the fingers to take out the memory cartridge, and then the memory cartridge can be manually taken out in a simple manner.

Now, as shown in FIG. 1, in the memory cartridge 10 there is formed a guide groove 10A which is used to prevent the reversed insertion of the upper and lower surfaces or front and rear portions of the memory cartridge 10. Also, in the connector 26, there is provided a projected portion (not shown) which can be inserted into the guide groove 10A. Due to this, if the memory cartridge 10 is inserted reversedly, then the memory cartridge 10 is pulled in by the roller 70, but the edge portion of the memory cartridge 10 is brought into contact with the projected portion of the connector 26, whereby the memory cartridge 10 cannot be pulled in to a predetermined position, that is, a position just before the contact of the connector 26. This prevents the output signal of the photo sensor 92 from going down to the L level and, due to this, the mounting operation of the memory cartridge 10 to the connector 26 by the pull-in claw 60 can be prevented. Also, at this time, there is produced slippage between the roller 70 and memory cartridge 10 to cause the roller 70 to rotate idly. Therefore, for example, when the roller 70 is rotating for a longer time than the time to pull in the memory cartridge 10 by a given amount, then it is decided that the memory cartridge 10 has been inserted reversedly and thus the roller 70 should be reversedly rotated in the cartridge discharge direction, so that the memory cartridge 10 reversedly inserted can be discharged automatically.

Also, the illustrated embodiment has been described as the memory cartridge loading/unloading device but, alternatively, only the loading operation of the memory cartridge may be performed as in the illustrated embodiment, and the unloading operation of the memory cartridge may be performed manually.

Further, in the illustrated embodiment, the slide plate 30 is adapted such that it can be moved when the pull-in claw 60 is closed. However, alternatively, the slide plate 30 may be stopped when the pull-in claw 60 is closed, by forming the elongated hole 88B of the drive lever 88 into a cam hole of a predetermined shape.

Still further, although the opening and closing operation of the pull-in claw 60 is performed by the driving force from the drive lever in the illustrated embodiment, this is not limitative but, for example, the opening and closing operation may be performed in conjunction with the movement of the slide plate 30.

As has been described hereinbefore, according to the invention, due to the fact that the memory cartridge is loaded by combining the friction feed means using the roller to be driven by the motor with the engagement feed means using the pull-in claw and the like, an excellent operability can be obtained and the loading of the memory cartridge can be performed with accuracy. Also, since the rotation shaft of the roller is pushed up in conjunction with the feeding operation of the engagement feed means to stay away from the memory cartridge so as to provide no obstacle to the movement of the memory cartridge, even if the memory cartridge loaded in the connector is left as it is for a long time, there is eliminated the possibility of the roller being deformed. Further, due to the fact that unnecessary external forces due to the pressure by the roller are not applied to the memory cartridge, there is avoided the possibility that the internal parts of the memory cartridge may be damaged or destroyed.

Also, since when the memory cartridge is moved in the cartridge insertion direction by means of the motor driving and is then mounted to the connector, the memory cartridge is pulled in through the spring before it is mounted to the connector and also a given force of energization can be given to the memory cartridge only when the memory cartridge is mounted to the connector, the memory cartridge can be mounted to the connector with accuracy as well as there is eliminated the possibility that unnecessary or unreasonable forces may be applied between the memory cartridge and connector. Further, the present invention is advantageous in that the motor need not be controlled with a high accuracy.

Moreover, due to the fact that the engagement member is opened and closed by means of the driving force from the drive means that moves the engagement member in the cartridge insertion/discharge direction, the opening and closing operation of the engagement member can be synchronized simply with the movement of the engagement in the cartridge insertion/discharge direction.

In addition, since the approach of the memory cartridge to the contact of the connector can be confirmed before it is pushed into the connector, for example, when the memory cartridge is inserted reversedly so that it does not approach to the contact of the connector, there can be eliminated the possibility that such a great force as occurs when the memory cartridge is mounted to the connector may be applied to the memory cartridge, so that the memory cartridge and connector can be protected.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A memory cartridge loading/unloading device, comprising:
   a roller for pressing against a memory cartridge inserted into a given position within a main body of an apparatus for using said memory cartridge in such a manner that a given frictional force is produced with respect to said memory cartridge;
   roller drive means for driving said roller in a cartridge insertion direction by use of a motor so that said memory cartridge is moved by said frictional force;
   a slide member movably disposed in a cartridge insertion/discharge direction;
   a claw-shaped engagement member disposed in said slide member, movable apart from said memory cartridge during the movement of said memory cartridge by said roller and engageable with said memory cartridge when said memory cartridge is moved by a given amount; and
   slide member drive means for driving said slide member in said cartridge insertion direction using a motor to thereby push said memory cartridge into a connector within said main body.

2. A memory cartridge loading/unloading device as set forth in claim 1, further including a roller retreat mechanism for pushing up a rotation shaft of said roller in conjunction with the feeding operation of said slide member in said cartridge insertion direction to thereby retreat said roller from said memory cartridge so as not to press against said memory cartridge.

3. A memory cartridge loading/unloading device as set forth in claim 1 or 2, wherein said roller drive means drives said roller in a cartridge discharge direction by use of a motor to thereby move said memory cartridge by means of said frictional force.

4. A memory cartridge loading/unloading device as set forth in claim 1, wherein said slide member comprises first and second slide members respectively movable in said cartridge insertion direction and interconnected with each other through a spring, said engagement member is disposed in said first slide member such that said engagement member is freely opened and closed, and said slide member drive means moves said second slide member ion said cartridge insertion direction to thereby mount said memory cartridge to said connector within said main body by applying a given energization force through said spring, first slide member and engagement member to said memory cartridge.

5. A memory cartridge loading/unloading device as set forth in claim 4, wherein said slide member drive means includes opening/closing means for closing said engagement member in conjunction with the motor driving of said second slide member in said cartridge insertion direction and for opening said engagement member in conjunction with the motor driving of said second slide member in said cartridge discharge direction.

6. A memory cartridge loading/unloading device as set forth in claim 4 or 5, wherein said second slide member includes a discharge claw for discharging said memory cartridge mounted to said connector out of said connector, and wherein said slide member drive means moves said second slide member in said cartridge discharge direction to thereby discharge said memory cartridge from said connector through said discharge claw.

* * * * *